US008693975B2

(12) United States Patent
Conners et al.

(10) Patent No.: US 8,693,975 B2
(45) Date of Patent: Apr. 8, 2014

(54) DOCKING UNIT AND VEHICLE POWER ADAPTER WITH FREQUENCY MODULATED AUDIO SIGNAL INJECTION FOR CONNECTING PORTABLE MEDIA PLAYER AND/OR COMMUNICATIONS DEVICE TO VEHICLE FM RADIO AND AUDIO SYSTEM FOR PLAYBACK OF DIGITAL AUDIO BROADCAST STREAM

(75) Inventors: Gary John Conners, Somerset, NJ (US); Nenad Popovic, Mercer, NJ (US); Efrain Luke Rodriguez, Brulington, NJ (US); Wearn-Juhn Wang, Middlesex, NJ (US)

(73) Assignee: Sirius XM Radio Inc., New York, NY (US)

( * ) Notice: Subject to any disclaimer, the term of this patent is extended or adjusted under 35 U.S.C. 154(b) by 762 days.

(21) Appl. No.: 12/860,184

(22) Filed: Aug. 20, 2010

(65) Prior Publication Data
US 2011/0045794 A1   Feb. 24, 2011

Related U.S. Application Data

(60) Provisional application No. 61/272,144, filed on Aug. 21, 2009.

(51) Int. Cl.
*H04B 1/06*    (2006.01)
*H05K 11/02*   (2006.01)
(52) U.S. Cl.
USPC ............... 455/346; 455/277.1; 455/127.2; 455/569.2; 455/270

(58) Field of Classification Search
USPC ........... 455/569.2, 345, 346, 277.1, 402, 270, 455/66.1, 42, 20, 127.1–127.5
See application file for complete search history.

(56) References Cited

U.S. PATENT DOCUMENTS

| | | | |
|---|---|---|---|
| 4,712,250 A * | 12/1987 | Michels et al. | 455/20 |
| 6,272,328 B1 * | 8/2001 | Nguyen et al. | 455/277.1 |
| 7,260,356 B2 * | 8/2007 | Helstrom et al. | 455/3.02 |
| 7,338,328 B2 | 3/2008 | Krieger et al. | |
| 7,454,166 B2 | 11/2008 | Patsiokas et al. | |
| 7,574,180 B2 * | 8/2009 | Abe et al. | 455/102 |
| 7,574,187 B2 | 8/2009 | Hyatt et al. | |
| 7,759,816 B2 * | 7/2010 | Krieger et al. | 307/9.1 |
| 7,771,075 B2 | 8/2010 | Luyckx et al. | |
| 7,773,938 B2 | 8/2010 | Voto | |
| 7,787,903 B1 * | 8/2010 | Myers | 455/556.1 |
| 7,844,303 B2 * | 11/2010 | Jubelirer | 455/569.2 |
| 8,184,430 B2 * | 5/2012 | Giffin et al. | 361/679.01 |

(Continued)

*Primary Examiner* — Edward Urban
*Assistant Examiner* — Rui Hu
(74) *Attorney, Agent, or Firm* — Roylance, Abrams, Berdo & Goodman, LLP

(57) ABSTRACT

A cigarette lighter adapter (CLA) is provided with a main body configured to be connected at one end thereof to a vehicle cigarette lighter socket or auxiliary power socket. The main body of the cigarette lighter adapter is also connected to one end of a coaxial cable. The other end of the coaxial cable is preferably terminated with a standard low cost DC connector for connection to a portable media player (e.g., with integrated or separate satellite radio receiver) or other content source that provides a frequency modulated (FM) radio frequency signal with audio content onto the coaxial cable 60. The FM signal is amplified by an amplifier in the main body of the CLA and then injected into the vehicle power system through the contacts in the mechanical housing of the main body and the vehicle cigarette lighter socket.

15 Claims, 16 Drawing Sheets

(56) References Cited

U.S. PATENT DOCUMENTS

| | | |
|---|---|---|
| 8,238,811 B2 * | 8/2012 | Lydon .......................... 455/3.03 |
| 8,442,438 B2 * | 5/2013 | Hsu et al. ....................... 455/42 |
| 2003/0060219 A1 * | 3/2003 | Parsiokas ..................... 455/501 |
| 2005/0227612 A1 * | 10/2005 | Helstrom et al. ............ 455/3.02 |
| 2006/0019616 A1 * | 1/2006 | Abe et al. ..................... 455/113 |
| 2007/0015537 A1 * | 1/2007 | DeBiasio et al. .......... 455/556.1 |
| 2007/0149247 A1 * | 6/2007 | Wong ............................ 455/557 |
| 2008/0051047 A1 * | 2/2008 | Walker et al. .............. 455/152.1 |
| 2008/0062053 A1 * | 3/2008 | Marko et al. .................. 343/713 |
| 2008/0227426 A1 * | 9/2008 | Lin ............................... 455/345 |
| 2009/0068948 A1 * | 3/2009 | Jubelirer ..................... 455/41.3 |
| 2010/0120366 A1 * | 5/2010 | DeBiasio et al. ............ 455/41.3 |
| 2010/0219978 A1 * | 9/2010 | Uozumi .................. 340/825.25 |

* cited by examiner

DOCKING UNIT AND VEHICLE POWER ADAPTER WITH FREQUENCY MODULATED AUDIO SIGNAL INJECTION FOR CONNECTING PORTABLE MEDIA PLAYER AND/OR COMMUNICATIONS DEVICE TO VEHICLE FM RADIO AND AUDIO SYSTEM FOR PLAYBACK OF DIGITAL AUDIO BROADCAST STREAM

This application claims the benefit of U.S. provisional application Ser. No. 61/272,144, filed Aug. 21, 2009, the entire contents of which are hereby incorporated by reference.

Related subject matter is disclosed and claimed in U.S. Pat. No. 7,454,166, the entire contents of which are hereby incorporated by reference. Reference is also made to commonly owned U.S. Patent Application Publication Nos. 2005/0227612 and 2008/0062053, the entire contents of which are also incorporated herein by reference.

BACKGROUND OF THE INVENTION

Digital music consumption (e.g., the acquisition of selected audio tracks for personal listening enjoyment) continues to increase with advances in digital music products such as on-line music services and devices for digital music storage and playback. In particular, portable media players and personal digital assistants such as the iPod available from Apple, Inc. and personal communication devices (e.g., mobile terminals or cellular telephones) such as the iPhone also available from Apple Inc., which have additional applications such as music download and playback applications, are becoming increasingly popular.

Existing download sources are not as comprehensive as, for example, the music library of a satellite digital audio radio service (SDARS) such as that of Sirius XM Radio Inc. For example, some download sources only provide users access to recordings of one or more particular recording companies. Furthermore, one of the primary drivers for consumption of new music and other media is exposure to new content through spontaneous programmed broadcast content such as FM radio, television, and satellite radio. In particular, exposure to a rich variety of content provided by a broadcast programmer such as Sirius XM Radio Inc. is a powerful motivator to gain interest in, investigate and ultimately acquire new music and other media.

Thus, a need exists for simple do-it-yourself interfacing of digital media players such as the iPod or iPhone with SDARS or similar programming service. A need also exists for simple, do-it-yourself interfacing of digital media players such as the iPod or iPhone with a SDARS or similar programming service available in a vehicle using an existing vehicle FM radio system. Further, a need exists for an application program that can be downloaded to a digital media player such as the iPod or iPhone for facilitating the selection, storage and playback (and, optionally, the acquisition) of content from a SDARS or similar programming service using the digital media player's user interface.

SUMMARY OF THE INVENTION

In accordance with an illustrative embodiment of the present invention, a vehicle cigarette lighter power adapter is configured to provide a frequency modulated (FM) radio frequency signal to a vehicle through the vehicle cigarette lighter socket or accessory power outlet for the purpose of transmitting audio content from a portable audio device via frequency modulated radio frequency signal to the vehicle's existing frequency modulation (FM) radio receiver.

Unlike existing installation devices that require a user to modify connections to an existing vehicle audio system (e.g., typically behind the dashboard and involving the addition of components and/or the changing of component connections to the head unit and/or vehicle FM receiver antenna), the exemplary embodiments of the present invention only require connection of a portable media player or similar device to the vehicle power system via the cigarette lighter socket or auxiliary power socket. In other words, the existing vehicle FM radio is unchanged and no further modifications are needed to the vehicle.

More specifically, exemplary embodiments of the present invention provide an apparatus and method for playing back audio content from a portable audio source such as a portable media player to vehicle speakers through the vehicle radio with good sound quality while maintaining compliance with radiated emissions regulations. Thus, exemplary embodiments of the present invention are superior to compliant wireless methods because these methods are subject to coupling between a transmit antenna in or otherwise associated with a portable media player and the vehicle radio antenna that is often poor and subject to interference from local broadcast radio stations. Other methods exist that improve the sound quality, but require installation of devices such as the XM SureConnect, Sirius FM Extender Antenna, and direct connection adapters that are installed in-line with the vehicle antenna cable. For example, the SureConnect employs a clamp or coupling mechanism that must be installed for physical coupling with the vehicle FM receive antenna (e.g., see U.S. Patent Application Publication No. 2008/0062053). The FM Extender requires installation of an extender cable or wire in close proximity with respect to the vehicle FM receive antenna. Direct connection adapters are generally professionally installed behind the dashboard of a vehicle for direct connection to the head unit or vehicle FM radio in-line with the existing vehicle FM radio antenna cable. By contrast, exemplary embodiments of the present invention require no special installation (i.e., modifying connections behind the dashboard of a vehicle or the addition of components and/or the changing of component connections to the head unit and/or vehicle FM receiver antenna); these exemplary embodiments only require plugging a power adaptor into a vehicle cigarette lighter socket or auxiliary power socket in a manner similar to using a mobile phone charger.

BRIEF DESCRIPTIONS OF THE DRAWINGS

The above and other aspects, features, and advantages of certain embodiments of the present invention will be more apparent from the following description taken in conjunction with the accompanying drawings, in which.

Figure 6:
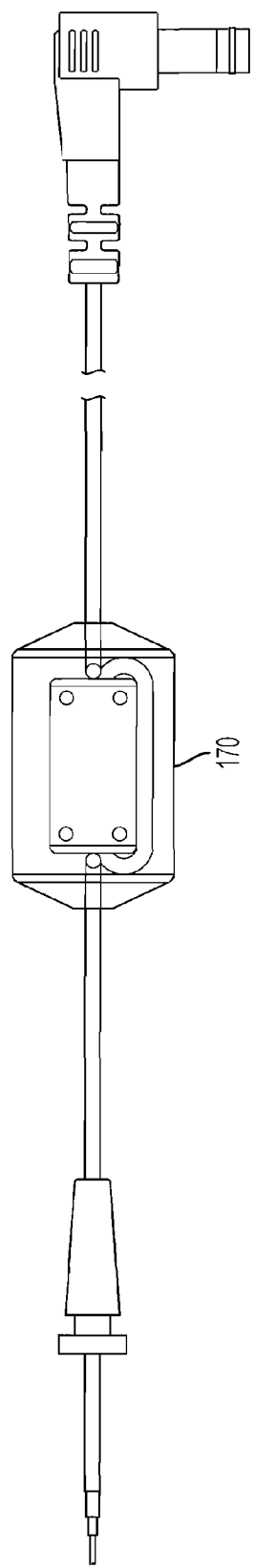
Figure 7:
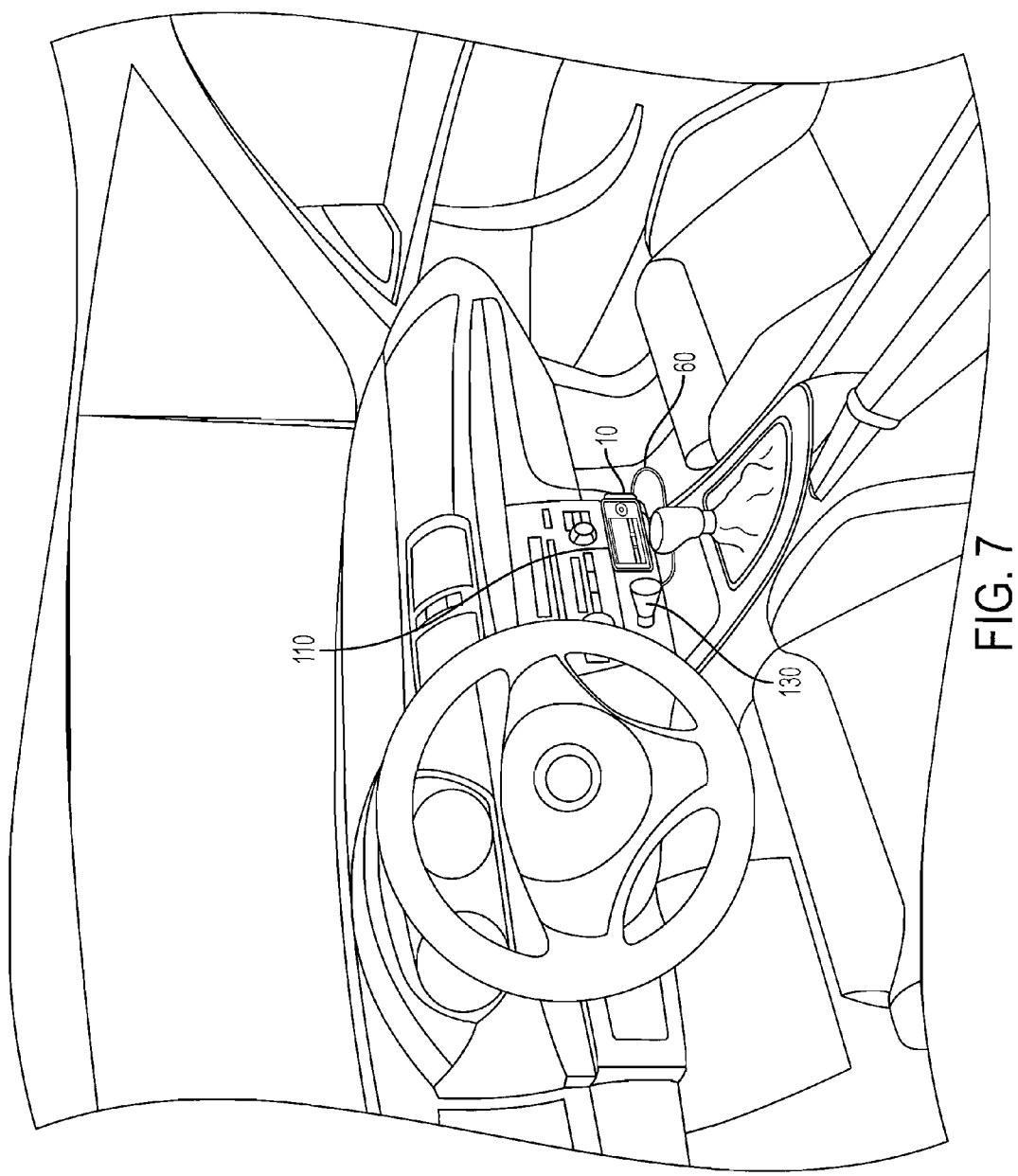
Figure 10:
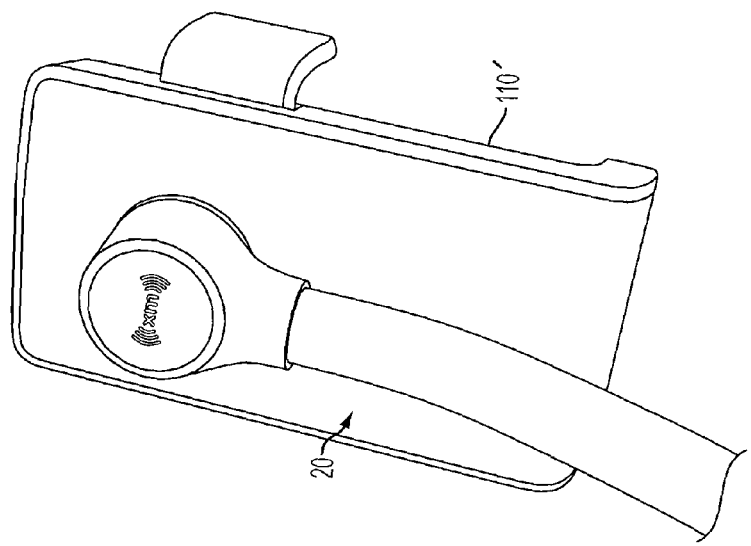
Figure 9:
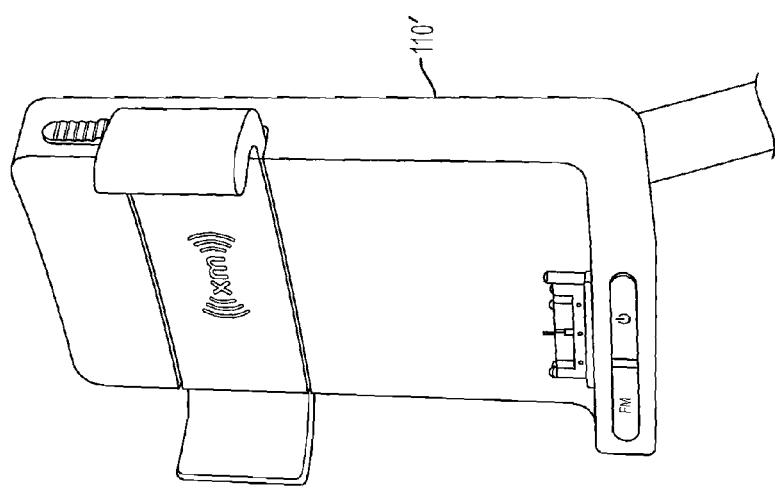
Figure 8:
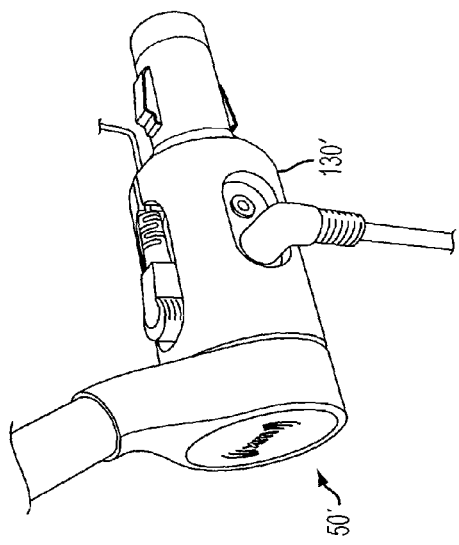
Figure 11:
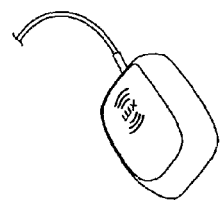
Figure 12A:
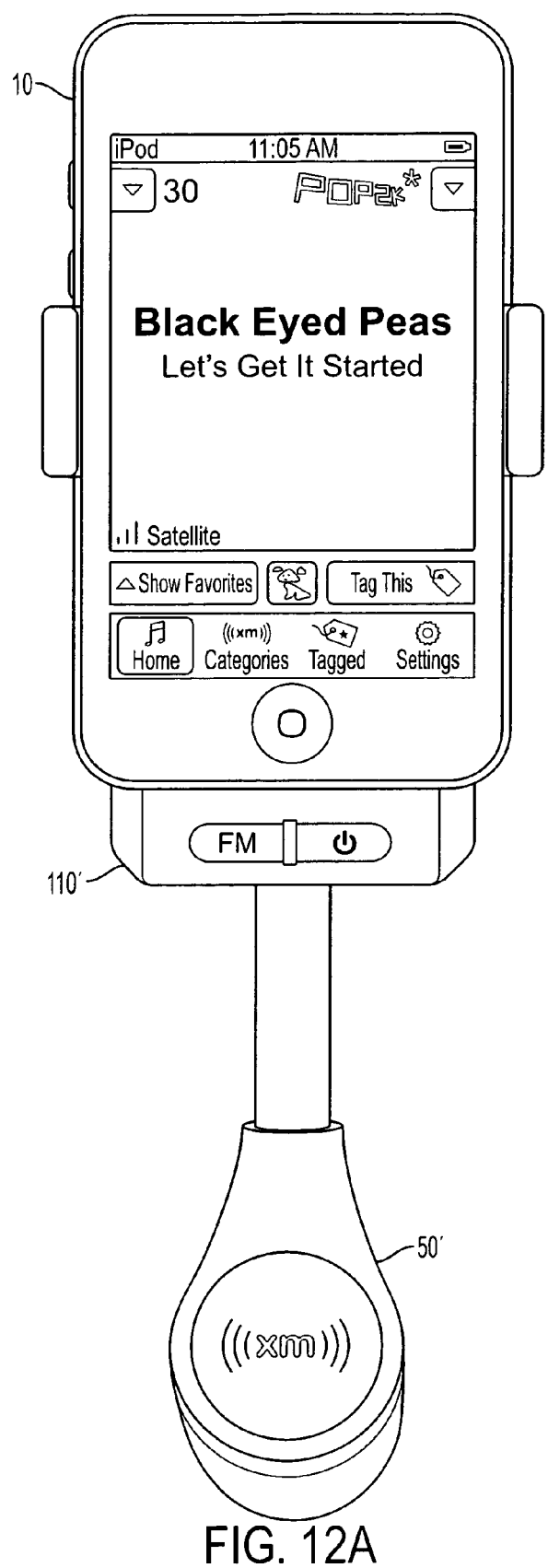
Figure 12B:
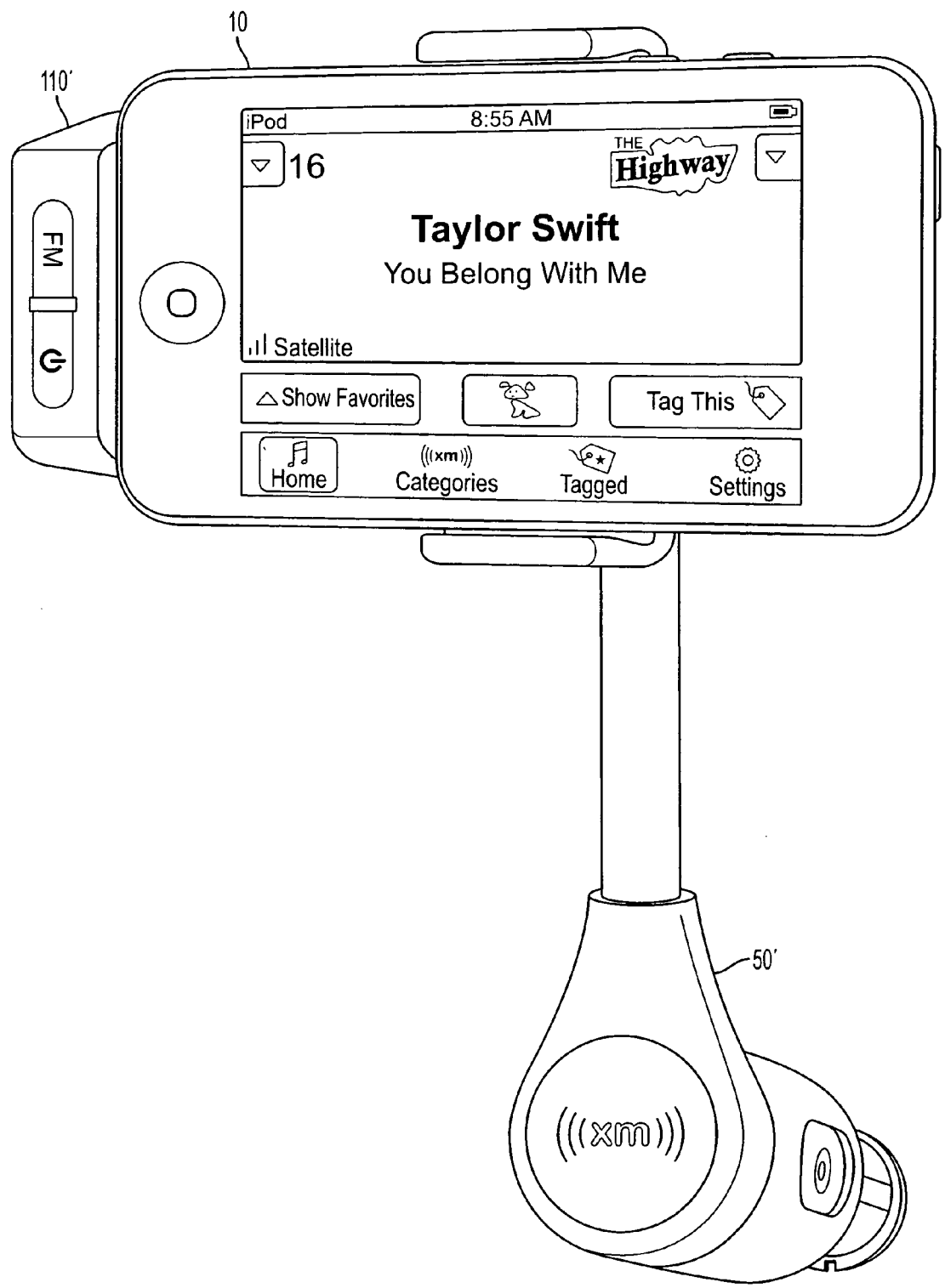
Figure 13:
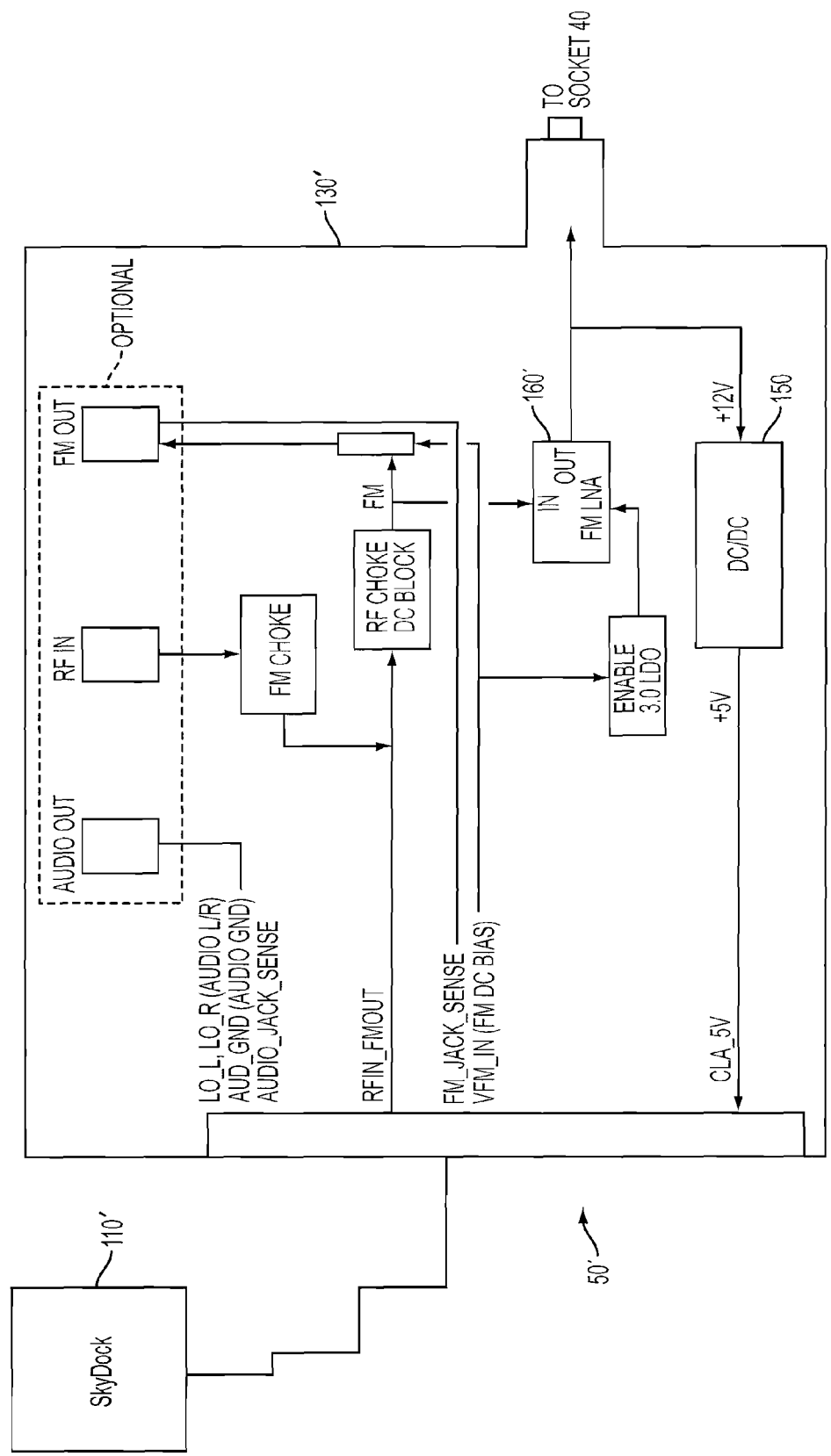
Figure 14:
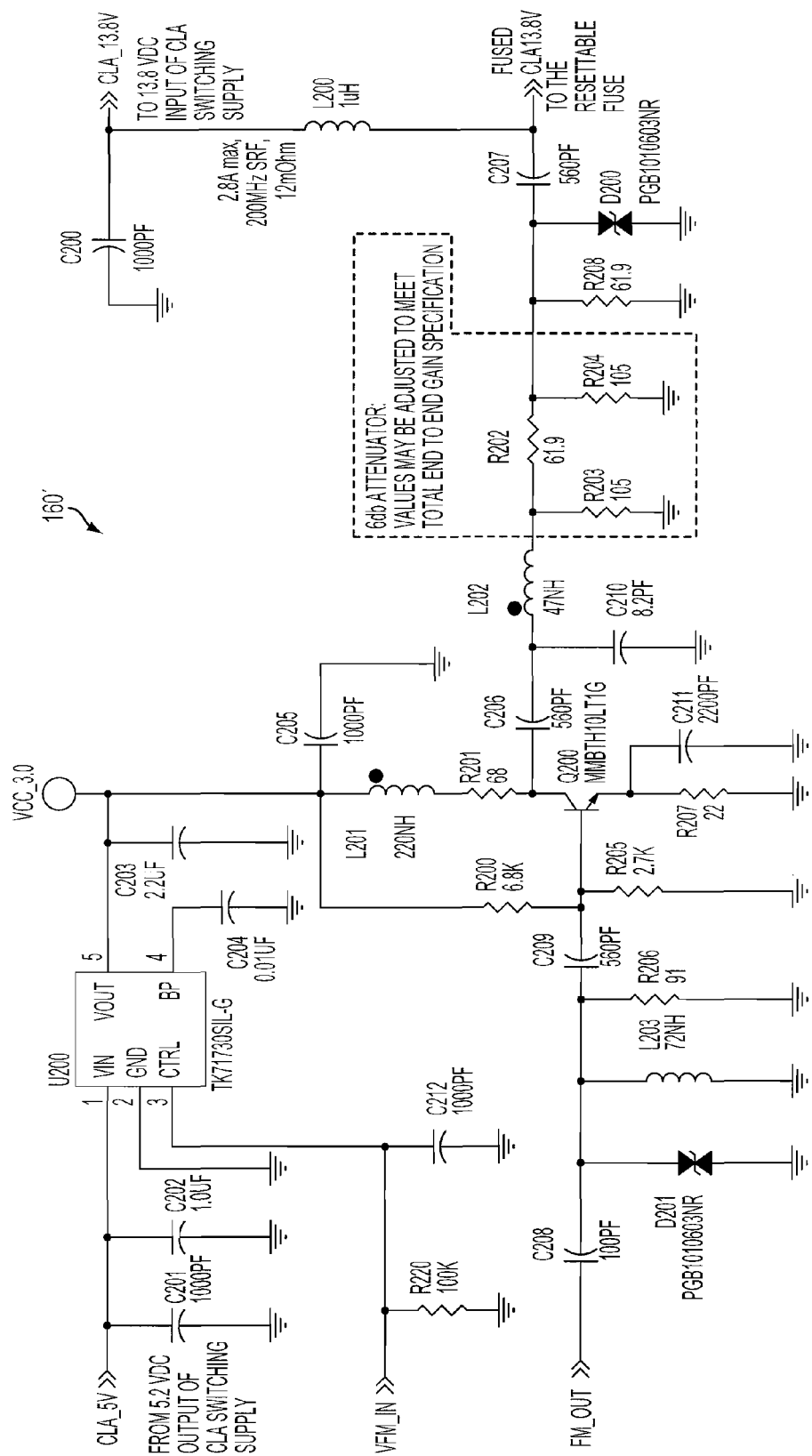

FIGS. 5A, 5B, 5C, 5D, and 5E are a schematic diagram of a cigarette lighter adapter or auxiliary power adapter constructed in accordance with an exemplary embodiment of the present invention;

FIG. 6 is a side view of a ferrite core on a cable with a media device connector constructed in accordance with an exemplary embodiment of the present invention;

FIG. 7 depicts a media player, dock, cigarette lighter adapter or auxiliary power adapter and cable provided in a vehicle in accordance with an exemplary embodiment of the present invention;

FIG. 8 is a perspective view of a cigarette lighter adapter or auxiliary power adapter constructed in accordance with an exemplary embodiment of the present invention;

FIG. 9 and FIG. 10 are, respectively, perspective front and rear views of a vehicle dock in accordance with an exemplary embodiment of the present invention;

FIG. 11 is a perspective view of an SDARS antenna in accordance with an exemplary embodiment of the present invention;

FIGS. 12A and 12B are front elevation views of a media player, dock and cigarette lighter adapter or auxiliary power adapter constructed in accordance with an exemplary embodiment of the present invention;

FIG. 13 is a schematic diagram of a cigarette lighter adapter or auxiliary power adapter constructed in accordance with another exemplary embodiment of the present invention; and FIG. 14 is a schematic diagram of an amplifier circuit in a cigarette lighter adapter or auxiliary power adapter constructed in accordance with another exemplary embodiment of the present invention.

Throughout the drawings, the same drawing reference numerals will be understood to refer to the same elements, features, and structures.

DETAILED DESCRIPTION OF THE EXEMPLARY EMBODIMENTS

Figure 1:
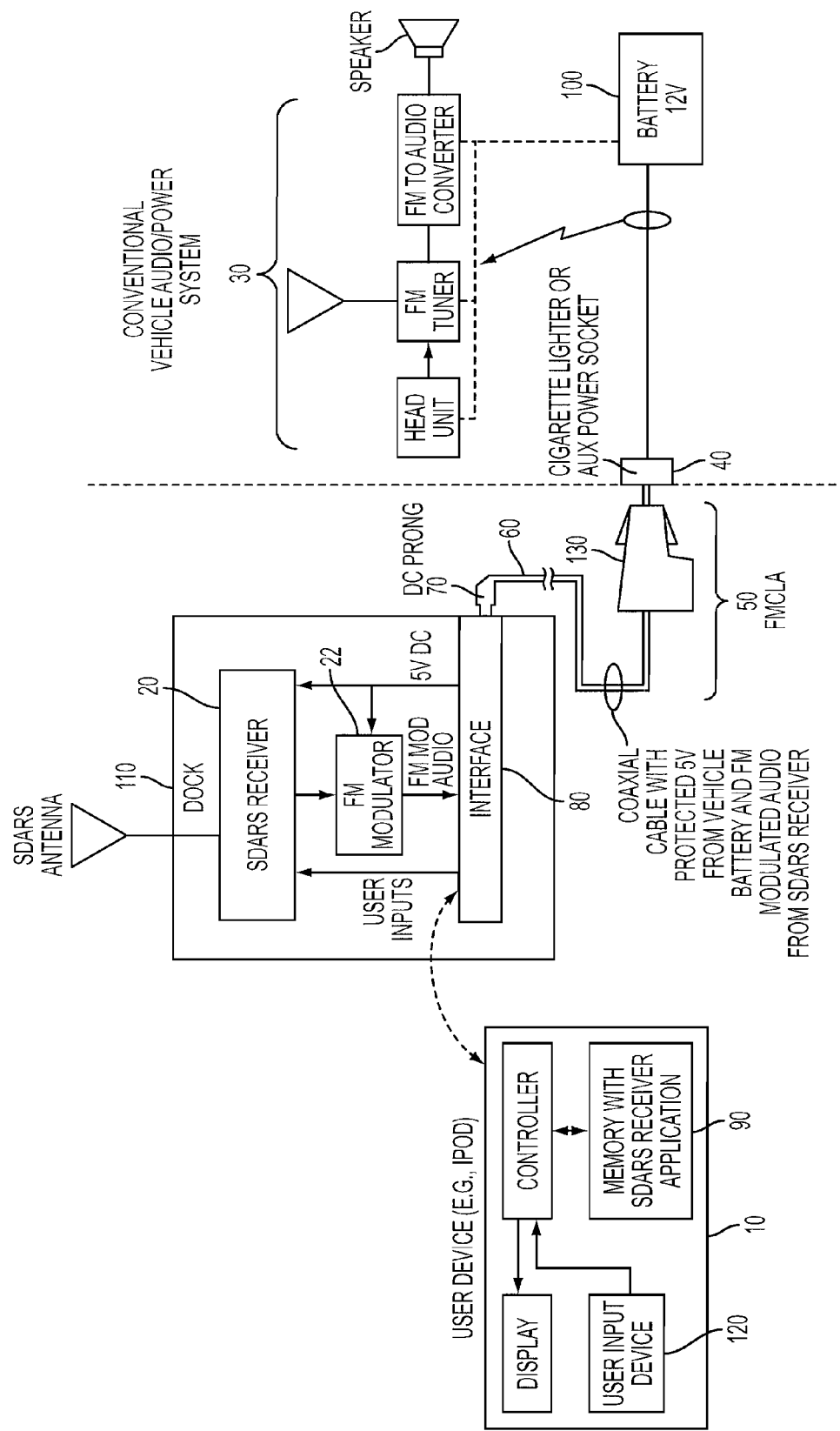
FIG. 1 depicts a portable media player and SDARS receiver connected to a vehicle using a cigarette lighter adapter or auxiliary power adapter constructed in accordance with an exemplary embodiment of the present invention.

FIG. 1 is an illustrative embodiment of a user device 10 such as an iPod connected to an SDARS receiver 20 that, in turn, can provide FM modulated audio signals to an existing and unmodified vehicle FM radio 30 via an existing and unmodified vehicle cigarette lighter socket 40 or auxiliary power socket. FIG. 1 depicts conventional vehicle audio and power systems. As described in further detail below, a cigarette lighter adapter (CLA) 50 converts the unprotected electrical power (e.g., 12 volts) from the vehicle battery 100 into protected 5 volts (V) to power the user devices (e.g., the iPod 10, the SDARS receiver 20 or other content source); and (2) injects an FM modulated audio signal in the FM broadcast band into the vehicle electrical system. For example, an audio signal from the device 10 and/or SDARS receiver 20 or other content source is provided to an FM modulator 22 in the dock 110 (or in the device 10 or receiver 20). The FM modulator 22 converts the audio signal to an FM modulated audio signal.

With continued reference to FIG. 1, the user device 10 is shown mounted to a dock 110 via an interface connector 80. The dock 110 is equipped with a satellite radio receiver 20 or other broadcast content source. The dock 110 can be provided with an antenna connector or the antenna can be connected to the CLA 50' as described below. It is to be understood that the user device 10 can have a satellite radio receiver 20 or other content source integrated therein, or be connected directly to a satellite radio receiver 20 or other content source without a dock. The user device 10 can be provided with an application program 90 that permits the satellite radio 20 or other content source to be controlled by the user device 10 (e.g., by employing the user device key pad or other user input 120 to select satellite radio program channel, tag a song for storage and playback, and the like).

Figure 2:
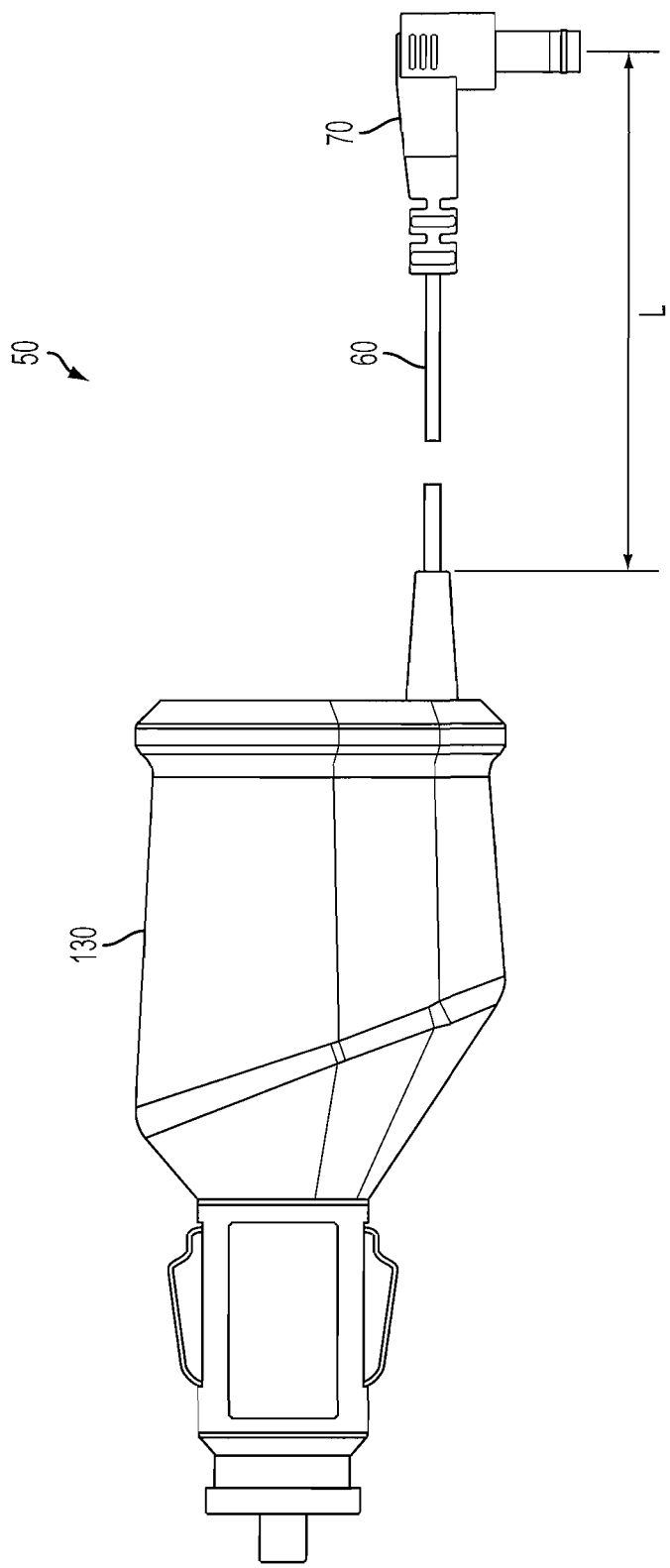
FIG. 2 is a side elevation view of a cigarette lighter adapter or auxiliary power adapter with cable and media device connector constructed in accordance with an exemplary embodiment of the present invention.
Figure 3C:
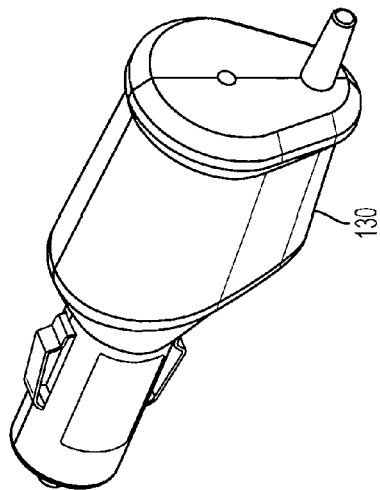
FIGS. 3A, 3B, 3C and 3D are, respectively, top, side, perspective and bottom views of a cigarette lighter adapter or auxiliary power adapter constructed in accordance with an exemplary embodiment of the present invention.
Figure 3D:
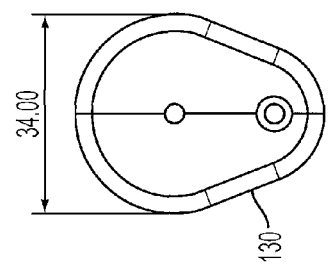
Figure 3A:
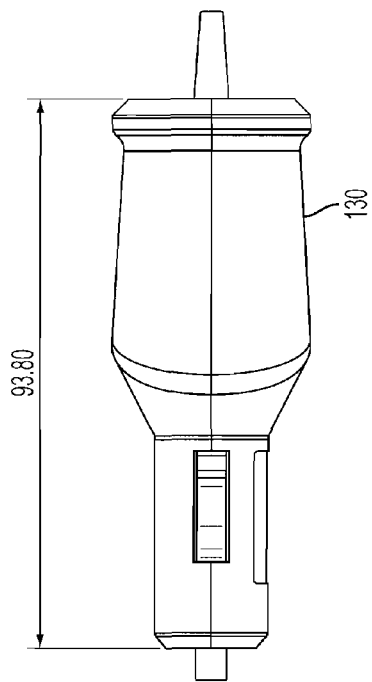
Figure 3B:
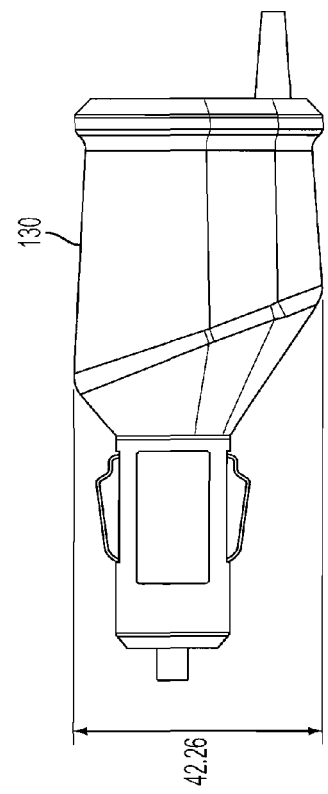

As shown in FIGS. 1 and 2, the CLA 50 connecting the dock 110 with the vehicle cigarette lighter socket 40 or auxiliary power socket comprises:

1. a cigarette lighter adapter main body 130 (e.g., a mechanical housing preferably constructed of a plastic shell and having electrical contacts) containing DC/DC converter electronics, electrical transient protection circuitry, and an RF amplifier circuit (e.g., optimized for frequency modulated (FM) audio broadcast band 88.1 MHz to 107.9 MHz), as described below;

2. a DC plug barrel connector or other connector 70 to connect to the device 10 or dock 110; and 3. a cable 60 (e.g., a coaxial cable or other link) capable of carrying at least 1.5 A at 5 VDC and an FM modulated RF signal in the FM broadcast band between the adapter main body 130 and the DC plug 70.

A signal source, such as from a satellite radio receiver 20 or a dock 110 for a portable media player 10 with integrated content source, provides a frequency modulated radio frequency signal with audio content onto the coaxial cable 60. The radio frequency signal is amplified by an amplifier in the main body 130 of the CLA 50 and then injected into the vehicle power system through the contacts in the mechanical housing of the main body 130 and the vehicle cigarette lighter socket 40. The electrical contacts on the mechanical housing of the main body 130 also conduct direct current (DC) from the vehicle power bus to a power supply circuit in the main body 130 of the CLA 50. The power supply circuit converts the voltage (typically from 13.8V to 5.0V), filters noise, and provides protection from electrical transients for the media player device 10 or other device connected to the coaxial cable 60 directly or via a dock 110.

Figure 4:
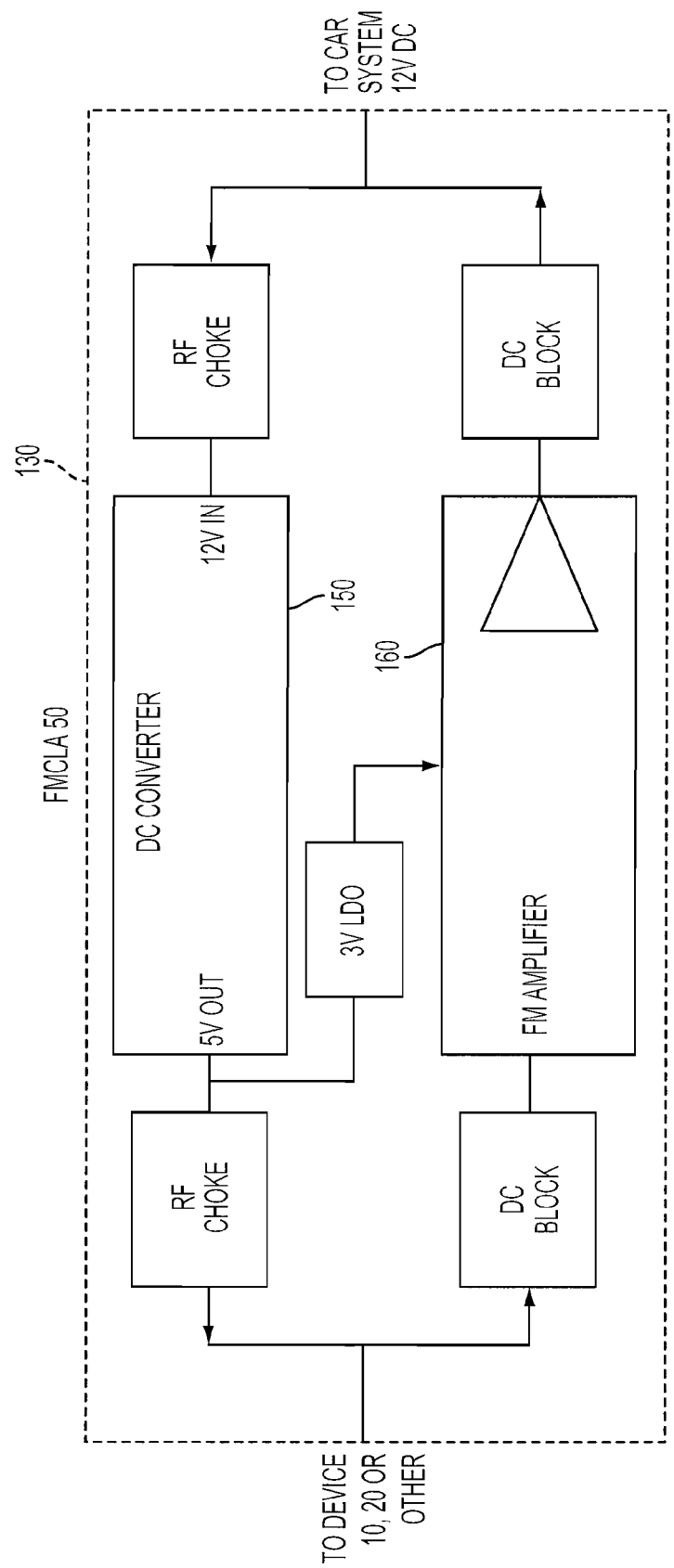
FIG. 4 is a block diagram of a cigarette lighter adapter or auxiliary power adapter constructed in accordance with an exemplary embodiment of the present invention.
Figure 5A:
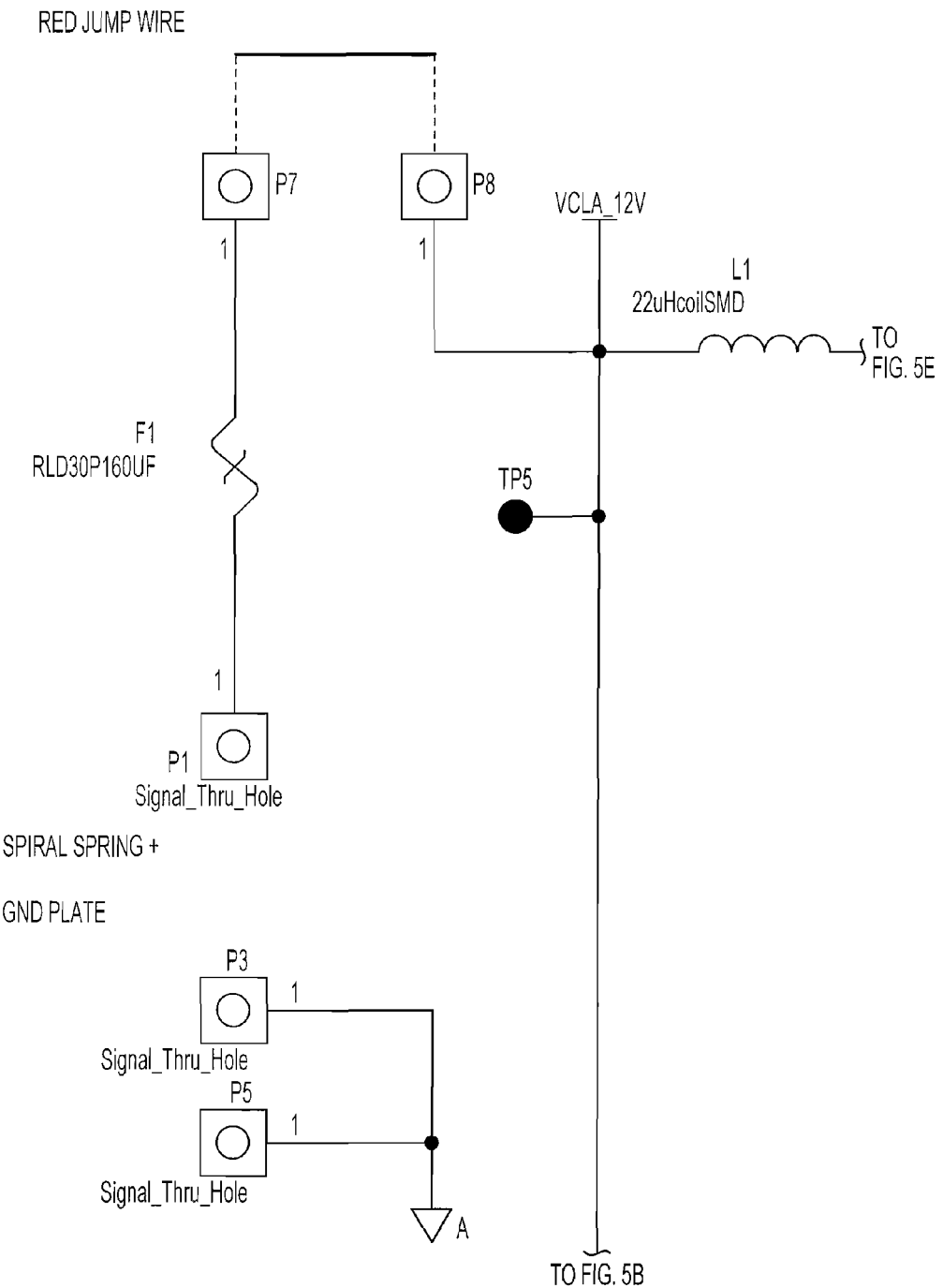
Figure 5B:
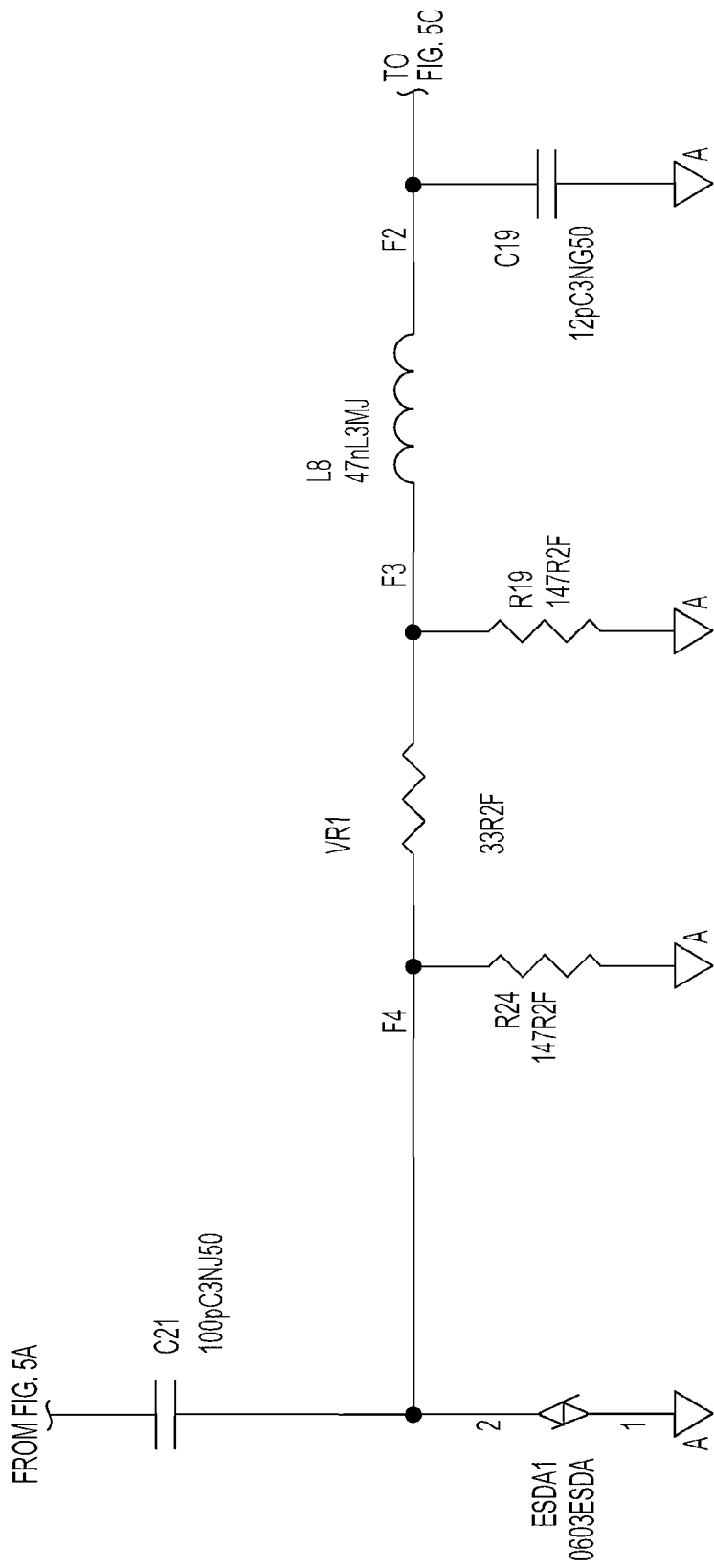
Figure 5C:
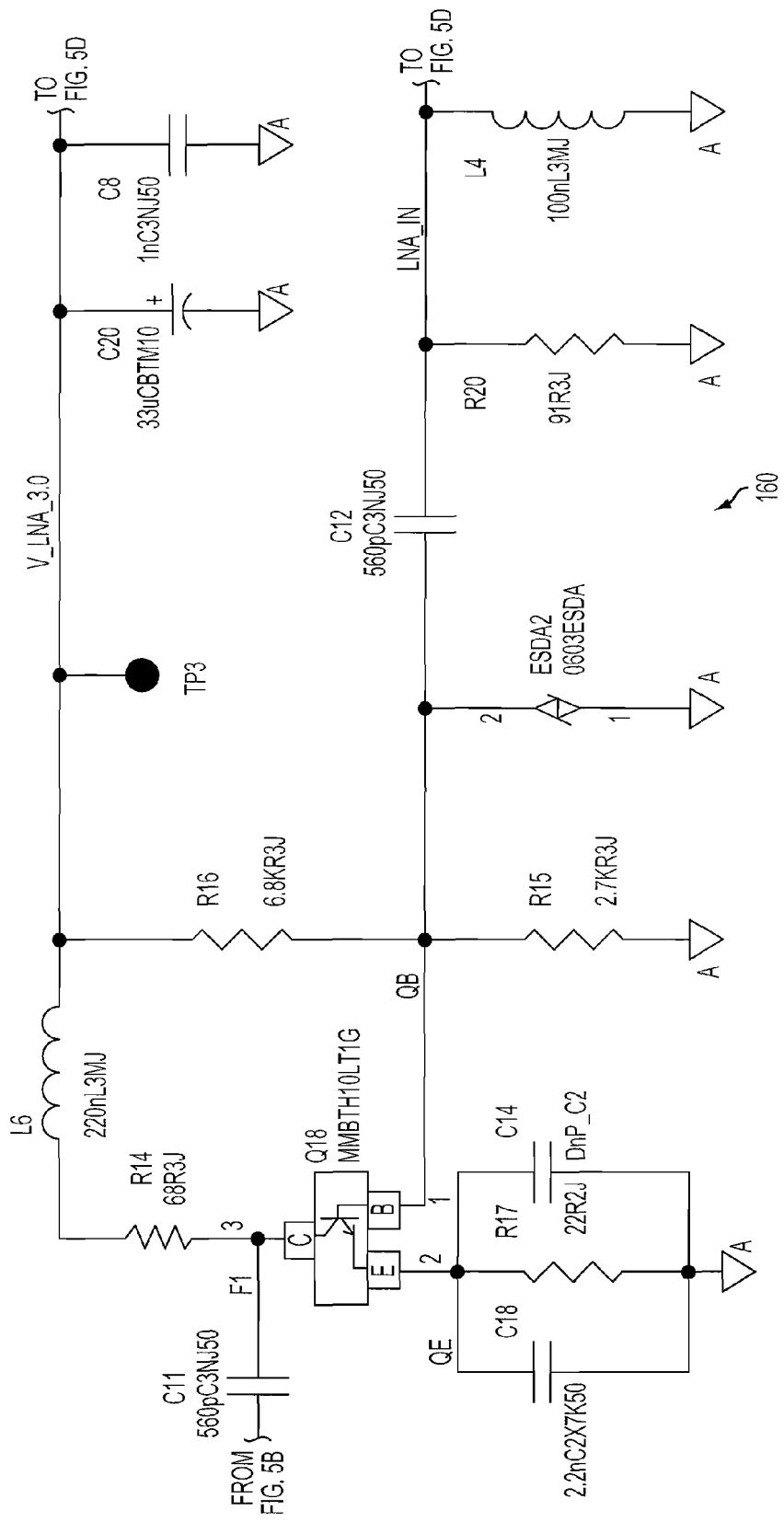
Figure 5D:
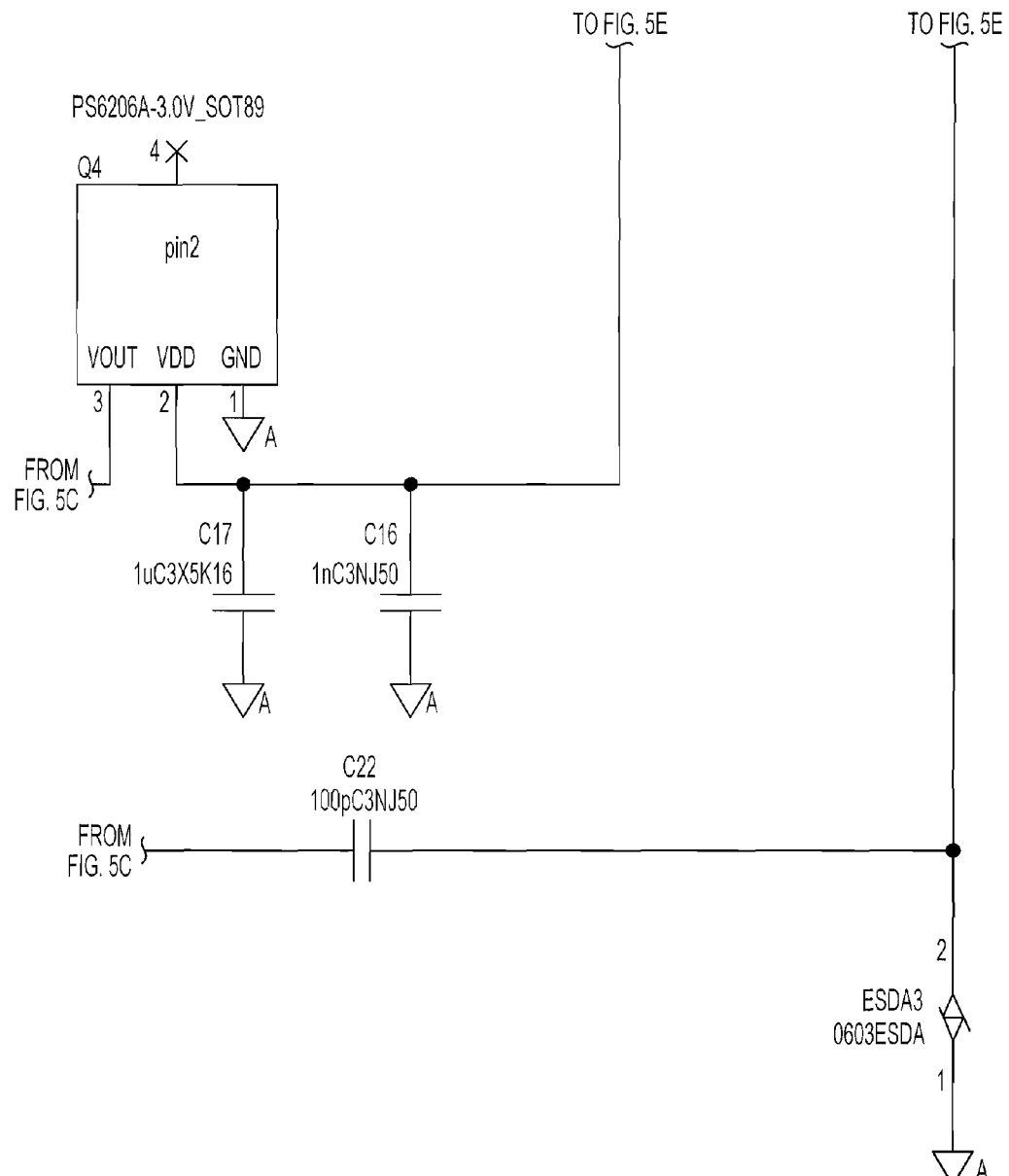
Figure 5E:
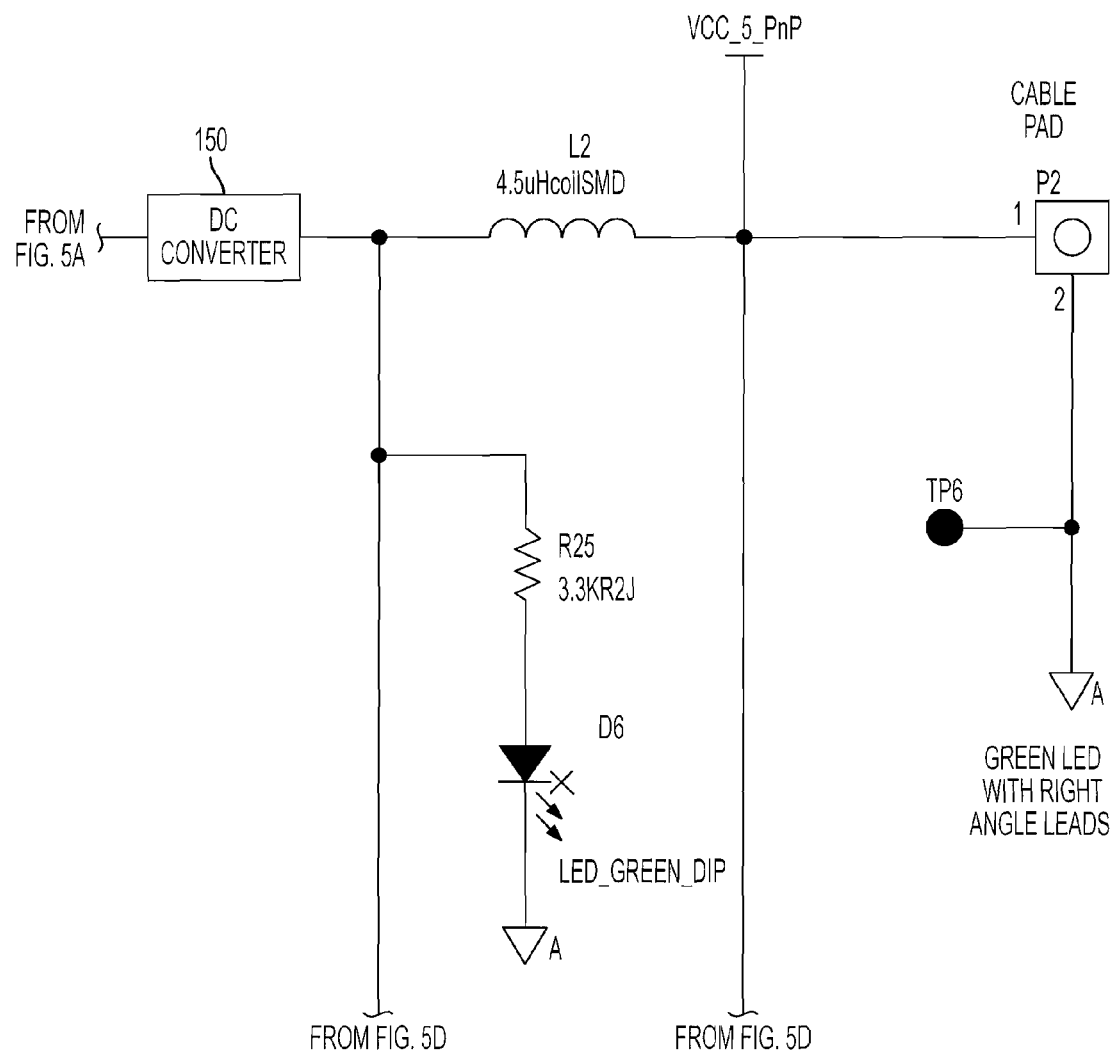

A CLA 50 constructed in accordance with an exemplary embodiment of the present invention is depicted in FIGS. 2, 3A, 3B, 3C and 3D. As stated above and depicted in FIG. 4, the main body 130 comprises electronics comprising at least a power supply circuit (e.g., DC converter) 150 and an amplifier 160.

As stated above, the CLA 150 of the present invention is configured to provide output of an FM modulator in a device 10 and/or 20 onto a main power input for transmission into a vehicle's electrical system. Signals such as channel changing commands from the device 10 are carried, for example, into a dock 110 via a connector 80 or interface such as the Sirius XM universal docking connector. The audio content from the selected channel is decoded from a content stream by the content source (e.g., the SDARS receiver 20 in the dock 110) and then converted into an FM modulated signal. An amplifier 160 preferably amplifies or attenuates the FM modulator output (e.g., in a PI-section attenuator) to correct the levels for FCC compliance. The amplified or attenuated signal is then capacitively coupled to a power jack where it joins the 5 VDC power connection 70. Although a DC plug barrel connection is shown, other connectors can be used for the DC power connection 70 to the external device such as another type of standard, low cost connector, or a matched impedance RF connector. An amplifier 160 constructed in accordance with an illustrative embodiment of the present invention is shown in more detail in FIGS. 5A through 5E. With regard to the power supply circuit 150, DC power arriving from the CLA 50 is routed in the dock 110 or directly to the devices 10 and/or 20 via FM reject filters comprising cascaded LC networks to avoid stray FM radiation.

As stated above, coupling the FM modulated signal down to the CLA 50 is preferably accomplished by a dual purpose coaxial cable 60, although other conductors can be used such as twisted pair (e.g., with unbalanced and balanced signal conversions as needed to minimize loss and leakage that can occur with transfer of RF signals). The coaxial cable 60 carries the power to the DC plug barrel connector 70 used to interface to the dock 110 and thereby power the device 10 and/or radio receiver 20. The same coaxial cable 60 carries the FM modulated signal in the opposite direction from the device 10 and/or 20 to the main body 130 of the CLA 50. As stated previously, the CLA 50 is a combined signal amplifier and power converter. In the CLA 50, a DC/DC power supply 150 is employed to convert a vehicle's power supply (e.g., 13.2V supply) to the 5V needed by many devices 10 and/or 20. The signal amplifier 160 located within the CLA housing 130 provides at least three benefits: proper RF termination, gain, and reverse isolation. Properly terminating the 50 ohm transmission line (e.g., coaxial cable 60) used to convey the FM modulated signal from the dock 110 to the CLA's main body 130 is essential to preventing signal reflections from the CLA end of the cable. It is desirable to prevent signal reflections owing to the fact that these reflections can radiate off the cable shield, wasting energy and making regulatory compliance more difficult (e.g., by making the radiation unpredictable and erratic). To prevent backward propagation of the FM signals reflected from the car electrical system, the amplifier 160 is designed to have very high reverse isolation. The combination of high reverse isolation and good input matching provide minimal reflections onto the cable 60 and therefore minimal radiation from the cable. The common emitter configuration of the signal amplifier 160 provides a moderate input impedance that is easily matched to 50 ohms and provides adequate signal gain to overcome signal loss in the coaxial cable 60. Appropriate tuning of the amplifier circuit, in particular the choke inductor L6, provides high reverse isolation to the input RF signal. Some radiation, however, still typically occurs. To eliminate the remaining radiation, a cable core ferrite 170, as shown in FIG. 6, can be used at preferably the end of the cable 60 proximal to the CLA main body 130 to choke remaining standing waves off the shield of the coaxial cable 60.

The cable 60 between the CLA body 130 and the 5V DC Plug 70 is preferably a coaxial-type cable capable of carrying DC voltage and current, as well as an RF signal with low loss on the center conductor. The shield of the cable can be connected to the vehicle ground reference at the cigarette lighter socket. The cable is preferably compliant with RG178 standard coaxial cable. As stated above, a ferrite core 170 may be attached to the cable 60 and preferably placed outside the CLA main body enclosure 130. The cable 60 can be wrapped through the ferrite core 170 with two turns and placed 30 mm from the end of the cable strain relief on the FMCLA enclosure 130, as shown in FIG. 6. The required ferrite core manufacturer and part number can be Fair-Rite 2643023002. The ferrite specifications can be as shown in Table 1.

TABLE 1

Example Ferrite core specification

| Parameter | Min | Nominal | Max | Unit |
| --- | --- | --- | --- | --- |
| Outside diameter (A) | 9.25 | 9.5 | 9.75 | mm |
| Length (B) | 18.35 | 19.05 | 19.75 | mm |
| Inside diameter (C) | 4.75 | | 5.05 | mm |

TABLE 1-continued

Example Ferrite core specification

| Parameter | Min | Nominal | Max | Unit |
| --- | --- | --- | --- | --- |
| Impedance @ 100 MHz (1 turn) | | 145 | | Ohms |
| # of cable turns | 2 | | | |

In accordance with an advantageous aspect of exemplary embodiments of the present invention, the routing of the FM modulated signal from the device 10 and/or 20 to the vehicle FM receiver 30 via the CLA 50 is through multiple paths such as being (1) conducted through the 12V wiring, radiated from the 12V wiring to the vehicle antenna (i.e., an electric field), and (2) coupled from the 12V wiring to other vehicle wiring that will conduct to the FM receiver 30 (e.g., magnetic field). The dominant path can be different for each vehicle. In this manner, the FM modulated signal from the device 10 and/or 20 is directed through the vehicle wiring after it exits the tip of the CLA 50 without requiring additional components and/or modifications to the vehicle wiring system and/or vehicle FM antenna, which is an important feature for allowing the CLA 50 and device 10 and/or 20 to be easily installed by the user. Additional unique aspects of exemplary embodiments of the present invention comprise the ability to control radiated emissions while conducting a sufficiently strong radio frequency signal into the vehicle cigarette lighter socket 40 and the method of efficiently coupling the radio frequency signal into the vehicle cigarette lighter adapter socket 40. The coaxial cable 60 and the amplifier circuit 160 are important in realizing these functions. The coaxial cable 60 provides shielding to contain the radio frequency signal within the cable 60. To avoid reflections of the radio frequency signal that can cause unwanted radiation, the cable 60 is terminated with essentially the same impedance as the intrinsic impedance of the cable 60. The amplifier circuit 160 is designed to provide the proper termination impedance for the cable 60 in the frequency band of operation. Signal reflections are also likely at the interface of the electrical contacts of the CLA 50 and the vehicle cigarette lighter socket 40 because the impedance of the cigarette lighter socket 40 is unknown and variable across different vehicles. The amplifier 160 is designed to have very low reverse transmission such that signals reflected from the cigarette lighter socket 40 do not travel back through the amplifier 160 and onto the cable 60.

FIG. 7 illustrates devices 10 and/or 20 connected to a vehicle via a CLA 50, which is constructed in accordance with an exemplary embodiment of the present invention and therefore simply requires being plugged into a vehicle power socket 40. No further modifications are needed to allow a user to use his or her digital media player or personal communications device to navigate content received via a content source and played back by an unmodified vehicle FM radio.

FIG. 8 illustrates a CLA 50', which is constructed in accordance with another exemplary embodiment of the present invention. The CLA 50' has optional connectors such as an antenna connector (e.g., to obviate having to place an antenna connector on the dock 110 and thereby facilitate wire management), an Audio out port and an FM out port. FIGS. 9, 10 and 11 illustrate different features of a dock 110' and an optional vehicle antenna. For example, the dock 110' preferably has an FM control button for controlling when an FM transmitter provided in the SkyDock 110' is on or off. FIGS. 12A and 12B illustrate a user device connected to a dock 110' and CLA 50' and in portrait and landscape orientations, respectively. This is due to the flexible stalk allowing for 180 degree dock rotation. FIG. 13 is a schematic of electronics in a CLA 50' main body 130 for use with SkyDock 110' in accordance with an exemplary embodiment of the present invention. Details of an amplifier 160' in the CLA 50' are provided in FIG. 14 in accordance with an exemplary embodiment of the present invention.

With reference to FIG. 13, the CLA 50' comprises a header or other connector for connection to the dock 110. Outputs from the header provide left and right stereo audio signal outputs and audio ground (e.g., LO_L, LO_R and AUD_GND) to an Audio Out circuit. The Audio Out circuit conditions audio signals from a media player device in the dock 110' for transmission to the vehicle radio by way of a cable connected between an Audio out port provided on the CLA 50' to an auxiliary audio input of the vehicle. An Audio_Jack_Sense signal is provided from the Audio Out circuit to dock 110' via the header to allow for the dock 110' to determine if the audio connector of the CLA 50' is being used, in which case the FM modulation in the dock 110' will be disabled. The RFIN_FMOUT signal is fed from a coaxial cable (e.g., cable 60), and carries RF signals from an antenna (e.g., an SDARS antenna) if an antenna is connected to the ANTENNA connector on the side of the CLA 50', and the FM modulated audio signal from the dock 110' to the CLA 50'. An FM choke is used to isolate the received SDARS signals from the FM modulated signals being provided from the dock 110' via the RFIN_FMOUT line to the amplifier 160'. An RF Choke and DC block circuit(s) are provided (e.g., see also FIG. 5) to block the SDARS signal and to remove the DC bias provided by the dock 110' to the SDARS antenna. The FM_out connector conveys FM-modulated audio signals from a media player device in the dock 110' for transmission to the vehicle radio by way of an FM Direct Adapter or other device that has been professionally installed to connect an FM-modulated audio output from a player and/or dock 110' directly to the vehicle FM radio (e.g., when no auxiliary audio input is available), thereby obviating the need for CLA injection of the FM-modulated audio signal into the vehicle power system wiring in accordance with illustrative embodiments of the present invention. An FM_Jack_Sense signal is provided from the FM_Out circuit to dock 110' via the header to allow for the dock 110' to determine if the FM connector of the CLA 50' is being used, in which case the FM modulation in the dock 110' can be automatically enabled by the software on the media player. VFM_IN is a power supply source that provides two functions. First, it is used to bias a relay in an FM Direct Adapter connected to the FM Out connector. Second, VFM_IN enables the 3V low-drop out voltage regulator that provides the power supply for the FM signal amplifier (160'). Several standard wires are provided between the CLA 50' for SkyDock 110' in addition to the coaxial cable 60. In SkyDock 110', the coaxial cable 60 carries the SDARS signal, FM signal, and the DC power for the SDARS antenna module.

With regard to AM/FM radio interference prevention, the CLA 50 or 50' in an automotive application preferably does not produce frequencies whose fundamental, or harmonic, frequencies generate sufficient energies, either radiated or conducted, that interfere with AM or FM radio reception in an automotive head unit receiver 30. The radiated emissions of the CLA itself, as tested according to ANSI C63.4-2003, does not exceed 38 dBuV/m in the frequency range of 88-108 MHz. The conducted emissions of the CLA into the 12V system preferably does not exceed −75 dBm in the frequency range 88-108 MHz with 100 kHz resolution bandwidth.

With regard to satellite radio product interference prevention, the CLA 50 or 50' operating from a 12V lead acid battery as supply and with a Sirius XM Radio Inc. product as a load, for example, preferably does not produce electrical interference that interferes with the normal operation of the Sirius XM product powered from the CLA, or emit either radiated or conducted interference that, when the CLA and the Sirius XM product are operating together as a system, would cause the combined emissions to exceed the FCC part 15 limits for an intentional radiator.

The dock 110 or 110' is advantageous because, among other reasons, it is the first satellite radio controlled by an iPod touch or iPhone or similar device. The dock 110 or 110' is also one of the first products to take advantage of the hardware control capabilities of iPhone OS 3.0. The dock 110 or 110' allows millions of iPod touch and iPhone users or other digital media player users to add live SDARS capability (e.g., SIRIUS XM Radio service) or other broadcast content service to their iPod touches or iPhones or medial players while in their vehicle to allow access to their favorite music anywhere they drive. As stated above, the dock 110 is designed for easy use through the existing vehicle audio system. The dock 110 or 110' has a built-in SDARS receiver 20 controlled by a free application 90 that users download from the Apple App Store. The application 90 allows control of the SDARS receiver 20 using the capabilities of the iPod touch or iPhone touch screen. Listeners can tag songs they hear on all of the SDARS music channels for later purchase from iTunes®. Users can also receive game alerts and sports ticker, artist and song alerts, as well as a stock ticker, on their iPod or iPhone from SDARS. The dock 110 also charges the iPod touch and iPhone devices 10 while listening to live satellite radio via the CLA connected to the vehicle power socket.

As stated above, the connection of the dock 110 or 110' to the CLA 50 or 50' simplifies Do-It-Yourself vehicle installation, working through the existing vehicle radio and wiring and making it easy to move from vehicle to vehicle. Additionally, an aux-in cable is provided to facilitate aux-in connections in vehicles that support this type of connection. The dock's flexible stalk, as shown in FIG. 10, optimizes the iPod touch or iPhone placement in the vehicle. Customers can view the touch-screen interface in portrait or landscape modes as illustrated in FIGS. 12A and 12B, respectively. Accessories include magnetic mount antenna and two additional spacers to accommodate the various iPod touch and iPhone product generations.

The foregoing disclosure of the exemplary embodiments of the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A vehicle power adapter for providing frequency modulated (FM) radio frequency signals from an external device to an FM receiver in a vehicle using the vehicle's existing wiring system without modification of the vehicle's electrical connections behind the vehicle's dashboard and without over-the-air transmission of the FM signals, the vehicle power adapter comprising:
   a main body configured to be received in a cigarette lighter socket of the vehicle, the main body having a first connector to receive direct current (DC) power from the vehicle power system when inserted into the vehicle cigarette lighter socket;
   a coaxial cable having a first end connected to the main body and a second end extending therefrom; and a second connector connected to the second end of the coaxial cable and configured for detachable connection to an external device;

wherein the main body comprises an amplifier circuit configured to receive the FM signals from the external device via the coaxial cable and to amplify the FM signals to a selected signal level that allows for their transmission to the FM receiver in the vehicle via the vehicle's existing and unmodified wiring system for reception and playback by the FM receiver, the main body being configured to provide the amplified FM signals to the vehicle's existing and unmodified wiring system when inserted into the cigarette lighter socket.

2. A vehicle power adapter as claimed in claim 1, wherein the main body further comprises a DC to DC converter configured to convert the DC power that is received from the vehicle power system when the vehicle power adapter is inserted into the cigarette lighter socket to a selected DC signal, and the coaxial cable is configured to deliver the selected DC signal to the external device.

3. A vehicle power adapter as claimed in claim 2, wherein the coaxial cable is configured to carry the selected DC signal to the external device while carrying the FM signals from the external device to the main body.

4. A vehicle power adapter as claimed in claim 2, wherein the DC to DC converter comprises filters to reject stray FM radiation.

5. A vehicle power adapter as claimed in claim 1, further comprising an attenuator circuit configured to attenuate the FM signals received from the external device to a selected level that complies with at least one of Federal Communications Commission Part 15 and regulatory limits for an intentional radiator.

6. A vehicle power adapter as claimed in claim 1, wherein the amplifier circuit is configured to provide matched impedance to the coaxial cable, amplify the FM signals from signal loss due to the coaxial cable, and provide isolation to the cigarette lighter socket from unwanted signal reflection that could cause unwanted radiation of the FM signals.

7. A vehicle power adapter as claimed in claim 1, wherein the main body consists of a unitary housing enclosing the amplifier.

8. A vehicle power adapter as claimed in claim 1, wherein the main body is configured to provide the amplified FM signals to the vehicle's existing and unmodified wiring system for output by the FM receiver in the vehicle without additional components or modifications to the vehicle's wiring.

9. A method for providing frequency modulated (FM) radio frequency signals from an external device to an FM receiver in a vehicle via a vehicle power adapter using the vehicle's existing wiring system without modification of the vehicle's electrical connections behind the vehicle's dashboard and without over-the-air transmission of the FM signals, the method comprising: receiving direct current (DC) power from the vehicle power system at a main body inserted into a cigarette lighter socket of the vehicle; receiving the FM signals from the external device at the main body via a coaxial cable having a first end connected to the main body and a second end configured to be at least detachably connected to the external device; amplifying the FM signals at the main body to a selected signal level that allows for their transmission to the FM receiver in the vehicle via the vehicle's existing and unmodified wiring system for reception and playback by the FM receiver; and providing the amplified FM signals to the vehicle's existing and unmodified wiring system when the main body is inserted into the vehicle cigarette lighter socket.

10. A method as claimed in claim 9, further comprises:
converting the DC power that is received from the vehicle power system when the main body is inserted into the cigarette lighter socket to a selected DC signal; and
providing the selected DC signal to the external device.

11. A method as claimed in claim 10, wherein said receiving the FM signals and said providing the selected DC signal are performed using the same coaxial cable.

12. A method as claimed in claim 11, wherein the coaxial cable is configured to carry the selected DC signal to the external device while carrying the FM signals from the external device to the main body.

13. A method as claimed in claim 9, further comprising containing the FM signals within the coaxial cable using shielding provided by the coaxial cable.

14. A method as claimed in claim 9, further comprising: providing matched impedance to the coaxial cable; amplifying the FM signals from signal loss due to the coaxial cable; and providing isolation to the cigarette lighter socket from unwanted signal reflection that could cause unwanted radiation of the FM signals.

15. A method as claimed in claim 9, further comprising attenuating the FM signals received in the main body from the external device to a selected level that complies with at least one of Federal Communications Commission Part 15 and regulatory limits for an intentional radiator.

* * * * *